No. 862,977. PATENTED AUG. 13, 1907.
W. P. LA FOLLETTE.
COMBINED PLOW AND CULTIVATOR.
APPLICATION FILED FEB. 13, 1907.
2 SHEETS—SHEET 2.

Witnesses
Thos. W. Riley
L. W. Anderson

Inventor
W. P. La Follette
By
W. J. FitzGerald & Co
Attorneys

UNITED STATES PATENT OFFICE.

WILLIAM P. LA FOLLETTE, OF NEW SALISBURY, INDIANA.

COMBINED PLOW AND CULTIVATOR.

No. 862,977.  Specification of Letters Patent.  Patented Aug. 13, 1907

Application filed February 13, 1907. Serial No. 357,198.

*To all whom it may concern:*

Be it known that I, WILLIAM P. LA FOLLETTE, a citizen of the United States, residing at New Salisbury, in the county of Harrison and State of Indiana, have invented certain new and useful Improvements in a Combined Plow and Cultivator; and I do hereby declare the following to be a full, clear, and exact description of the invention, such as will enable others skilled in the art to which it appertains to make and use the same.
My invention relates to a combined plow and cultivator and my object is to provide a device of this class whereby the soil will be loosened and pulverized at one operation.

A further object is to provide means for operating the plow and pulverizing construction whereby said device may be directed into or out of engagement with the soil.

A still further object is to provide means for operating the plow and pulverizing mechanism independently of each other.
Other objects and advantages will be hereinafter referred to and more particularly pointed out in the claims.

Figure 1:
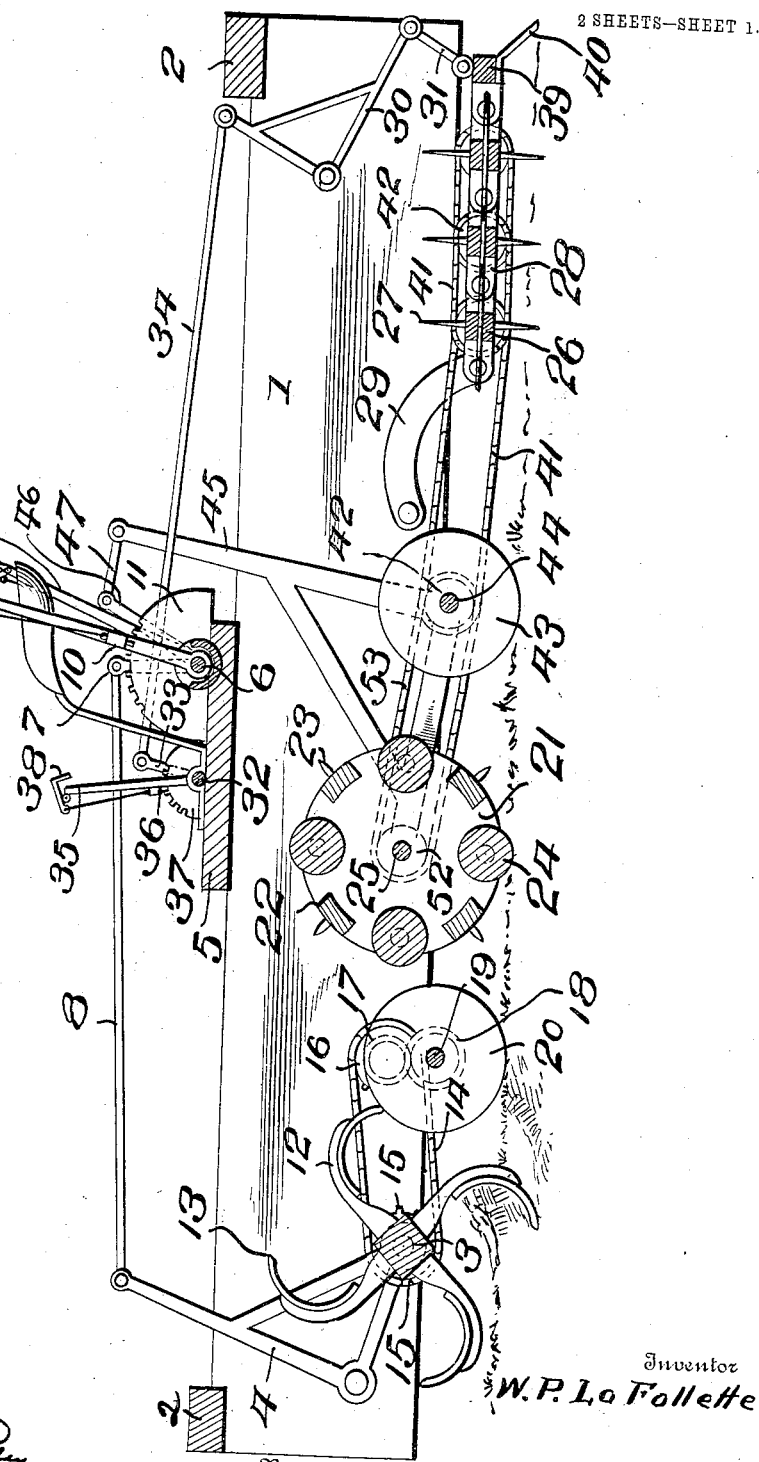
Figure 2:
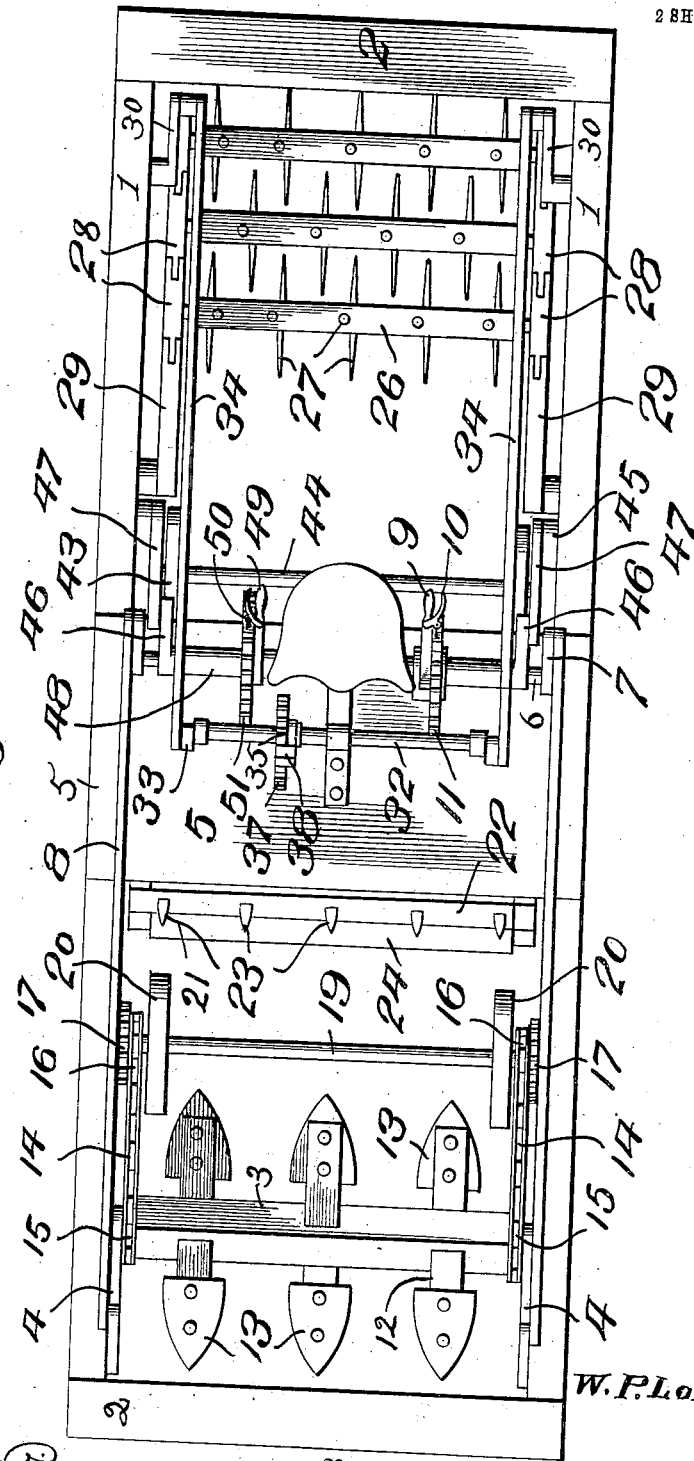

In the accompanying drawings which are made a part of this application, Figure 1 is a longitudinal sectional view through the plow and pulverizer, and, Fig. 2 is a top plan view thereof.

Referring to the drawings in which similar reference numerals designate corresponding parts throughout the several views, 1 indicates the side rails of my improved device which are connected together at their opposite ends by means of cross beams 2, said side rails and cross beams forming a frame.

Disposed between the forward ends of the side rails 1 is a shaft 3 which is rotatably mounted in one arm of the bell crank levers 4, said levers being in turn pivotally secured to the side rails 1.

A platform 5 is disposed across the side rails 1 and has mounted thereon, a shaft 6 to the opposite ends of which are secured crank arms 7 between which and the free or upwardly extending arms of the bell crank levers 4, are disposed connecting rods 8, the object being that when the shaft 6 is rotated the shaft 3 will be raised or lowered and in order to conveniently rotate the shaft 6 I have rigidly secured thereto, an operating lever 9, which is provided with the usual form of latch 10 adapted to coöperate with a rack bar 11, the latch 10 and rack bar 11 serving to hold said lever in its adjusted position.

The shaft 3 has secured thereto a plurality of curved shanks 12 to the outer end of each of which is secured a shovel 13 so that when said shaft is rotated the shovels will engage the earth and loosen the same, the shaft 3 being rotated through the medium of a sprocket chain 14 which is disposed around a sprocket wheel 15 on the shaft 3 and around a similar sprocket wheel 16 rotatably mounted upon the side rail 1, the sprocket wheel 16 being integral with a cog wheel 17 meshing with a cog wheel 18 mounted upon a driving shaft 19, the shaft 19 being in turn driven by means of driving wheels 20, it being clearly understood that there is a set of the above described mechanisms at each end of the shaft 3. By this construction it will be seen that when the device is driven forward the shovels 13 will be rapidly rotated thereby thoroughly chopping and loosening the soil.

In order to thoroughly pulverize the loosened soil, I dispose immediately in the rear of the driving wheels 20, a pulverizing drum 21, said drum having a plurality of bars, 22, thereon, upon which are located spikes 23 which are adapted to engage and disintegrate the particles of the soil and between the bars 22 I have disposed rollers 24 which are rotatably mounted upon the drum and are adapted to crush the soil as the drum is passed thereover.

The drum 21 is rotatably mounted upon a shaft 25 which extends laterally between the side rails 1 and finds bearings therein. In same manner as shaft 3.

Disposed in the rear of the pulverizing drum 21 is a plurality of shafts 26, each of said shafts having teeth 27 radiating therefrom which are adapted to harrow the soil after the same has been pulverized, the shafts 26 being so constructed that they will rotate, the ends of the shafts finding bearings in links 28, said links being pivotally secured together and so arranged that should the teeth upon one of the shafts encounter a solid substance that particular shaft will yield thereby preventing the teeth from becoming broken.

The links on the innermost shaft 26 are pivotally secured to one end of a curved arm 29, the opposite end of said arm being pivotally secured to the side rails 1. The object in so mounting the shafts is to admit of the same being elevated out of engagement with the soil and to accomplish this result I have provided a bell crank lever 30 at each side of the device, said levers being pivotally secured to the side rails 1 and connected to the bar 39 by means of arms 31.
In order to conveniently operate the bell crank lever 30 and raise the shafts 26 I have disposed upon the platform 5 a shaft 32 which is provided at each end with crank arms 33 between the upper ends of which and the bell crank levers 30 is disposed a connecting rod 34 so that when the shaft 32 is rotated the bell crank levers 30 will be operated and the shafts 26 raised or lowered.

The shaft 32 is provided with an operating lever 35 to which is secured a latch 36 which in turn coöperates with a rack bar 37, the latch 36 being operated by means of a foot lever 38 which is pivotally secured to the upper end of the operating lever 35 so that when it is desired to throw the lever 35 forward, and elevate the shafts 26, the operator engages the lever 38 with his foot and depresses the same thereby disengaging the latch 36 from the rack bar and by forward pressure with the foot, the parts secured to the operating lever 35 are operated.

Secured to the rear link 28 is a bar 39 to which are attached depending plates 40 which are adapted to drag over the surface of the soil and smooth the same at the same time pulverizing such particles of the soil not previously pulverized by the drum and teeth 27.

The shafts 26 are rotated by disposing sprocket chains 41 into engagement with sprocket wheels 42 secured to the ends of the shafts 26, one of the sprocket chains being extended forwardly and disposed into engagement with a sprocket 42 secured to a driving wheel 43. The driving wheels 43 are mounted upon a shaft 44 said shaft being in turn carried by elevating levers 45, one arm of each of said levers being pivotally mounted upon the shaft 25 while the opposite end thereof is directed upwardly and connected to crank arms 46 by means of straps 47.

The crank arms 46 are formed integral with a tubular shaft 48, said shaft being disposed around the shaft 6 and adapted to rotate independently thereof. The tubular shaft 48 is controlled by means of a lever 49 which is provided with a latch 50 which is in turn disposed into coöperative relation with a rack bar 51.

It will be seen that by this construction the driving wheels 43 can be readily elevated and the rotation thereof stopped. To give the pulverizing drum a positive rotation I have disposed upon the shaft 25 a sprocket 52 around which is directed a sprocket chain 53 which is in turn directed around a sprocket on the shaft 44 so that when the driving wheel 43 is in operation the pulverizing drum 21 will be positively rotated.

By this construction it will be seen that I have provided a device whereby the soil will be chopped up and thoroughly disintegrated thereby thoroughly preparing the soil as a seed bed at one operation. It will also be seen that I have so arranged the parts of the device that they can be readily controlled by the operator from a convenient point upon the platform, said platform being provided with a seat which is located in juxtaposition to the various operating levers.

What I claim is:

1. The combination with the frame, of a transverse shaft mounted therein, a pulverizing drum carried by said shaft, a plurality of shafts to the rear of said drum, links forming bearings for the ends of said shafts and pivotally connected together, curved arms pivoted in the frame and pivotally connected with the forward of said shafts and means for giving said shafts a positive rotation from the drum shaft.

2. The combination with the frame, of a transverse shaft mounted therein, a pulverizing drum carried by said shaft, a plurality of shafts to the rear of said drum, links forming bearings for the ends of said shafts and pivotally connected together, curved arms pivoted in the frame and pivotally connected with the forward of said shafts, means for giving said shafts a positive rotation from the drum shaft, and means for raising and lowering said plurality of shafts.

3. The combination with the frame, of a transverse shaft mounted therein, a pulverizing drum carried by said shaft, a plurality of shafts to the rear of said drum, links forming bearings for the ends of said shafts and pivotally connected together, curved arms pivoted in the frame and pivotally connected with the forward of said shafts, means for giving said shafts a positive rotation from the drum shaft, and bell crank levers pivoted in the frame and pivotally connected with the rearmost of said shafts.

4. The combination with the frame, of a transverse shaft mounted therein, a pulverizing drum carried by said shaft, a plurality of shafts to the rear of said drum, links forming bearings for the ends of said shafts and pivotally connected together, curved arms pivoted in the frame and pivotally connected with the forward of said shafts, means for giving said shafts a positive rotation from the drum shaft, bell crank levers pivoted in the frame and pivotally connected with the rearmost of said shafts, and means for actuating said bell crank levers without affecting the means for rotating said shafts.

In testimony whereof I have signed my name to this specification in the presence of two subscribing witnesses.

WILLIAM P. LA FOLLETTE.

Witnesses:
  JOSEPH F. ARMSTRONG,
  MAMIE L. K. TROTTER.